Patented Nov. 16, 1937

2,099,237

UNITED STATES PATENT OFFICE 2,099,237

COATING COMPOSITION

Robert L. Sibley, Nitro, W. Va., assignor, by mesne assignments, to Monsanto Chemical Company, Wilmington, Del., a corporation of Delaware No Drawing. Application February 15, 1932, Serial No. 593,199

20 Claims. (Cl. 134—56)

The present invention relates to improvements in coating compositions and to the process of preparing same. More particularly the invention relates to coating compositions containing a drying oil and includes as its object the provision of a composition possessing the characteristic property of interrupting or retarding the continued oxidation of oils, paints, varnishes and the like after said products have reached the desired oxidized condition.

In the manufacture of paints and varnishes including the incorporation of drying oils therein, it is usually customary to employ a suitable quantity of an oxidation catalyst to speed up the normal drying rate of the oil so that the composition will dry hard within a reasonable time when it is spread on a surface in a thin film. This positive oxidation catalyst is commonly called a dryer. It is known that the dryers commonly employed induce various oxidation phenomena, some of which are necessary and desirable and some of which are very objectionable from the practical operation standpoint. According to the present invention, the undesirable qualities of the so-called dryers are substantially eliminated by the incorporation in paints, varnishes, oils and the like of a small proportion of a preferred class of oxidation inhibitor comprising aldehyde condensation products and derivatives thereof.

As one method of operating the present invention, a varnish was prepared by heating seven pounds of tung oil and two pounds of modified phenolic resin to 450° F. for sixty minutes, after which the resulting product was cooled to 420° F. and thinned with one and one-third gallons of mineral spirits. Substantially twenty grams of a lead-cobalt naphthenate dryer were added thereto. The material thus obtained was a very rapid drying varnish which contained substantially 56% of non-volatile matter.

To one hundred gram portions of the finished varnish prepared in the manner described, 0.173 gram of an aldehyde condensation product or derivative thereof was added in a convenient manner, and the treated varnish tested in the manner hereinafter described. As specific examples of the operation of the present invention, acetaldol (a condensation product of two molecular proportions of acetaldehyde), di-ethylidene-diamido-hydroxy-diphenylamine (a reaction product of substantially two molecular proportions of acetaldehyde and substantially one molecular proportion of para-hydroxy-2-4-diamino-diphenyl-amine), the reaction product of substantially equi-molecular proportions of crotonaldehyde and aniline further reacted with substantially an equimolecular proportion of beta naphthol, the reaction product of substantially one molecular proportion of acetaldehyde with substantially two molecular proportions of phenol further reacted with substantially one molecular proportion of aniline, and the reaction product of substantially one molecular proportion of p,p'-diamino-diphenyl-methane with substantially two molecular proportions of beta-naphthol produced by heating said reactants preferably at a temperature of 180° C. in the presence of iodine as a catalyst with the separation of water of condensation, were each incorporated in 100 gram portions of the above prepared varnish. The p,p'-diamino-diphenyl-methane employed in producing the product described is prepared by rearranging by means of a catalyst, as for example hydrochloric acid, the reaction product of substantially one molecular proportion of formaldehyde with substantially two molecular proportions of aniline. Its reaction product with an aryl hydroxide, for example beta-naphthol, therefore, is included within the scope of the present invention. The various varnish compositions so prepared were coated over clean black panels in a convenient manner, as for example by flowing thereon. Samples of the untreated varnish were also incorporated in the same manner on identical iron panels for purposes of comparison. The panels prepared in the manner described were exposed to the sun's rays in the open atmosphere and sprayed daily with water. Frequent examinations were made. At the end of nine weeks' exposure in the weather test a marked improvement was found in the durability of the varnishes wherein the preferred materials set forth were incorporated against weathering, oxidation and the like over that in which no oxidation inhibitor was incorporated.

It is thus shown from the above tests that the invention herein set forth comprises an important advance in the art of varnish, oil and paint manufacture.

Other products which are equivalent in nature and general characteristics to those hereinbefore set forth and which are adaptable to use in the manner described to produce surface coating compositions of the paint and varnish type comprise the reaction products of propionaldehyde, acrolein, butyl aldehyde, valeric aldehyde, hexoic aldehyde, heptaldehyde, furfuraldehyde, salicyl aldehyde, benzaldehyde and the like with aniline, diphenyl-amine and its amino substitution products, diaminodiphenylmethane and with other amino phenyl products.

It is obvious that the process and compositions described herein may be varied widely in their details without departing from the spirit or scope of the present invention. These possible variations will be apparent to those skilled in the art and the present invention is not limited to the specific details mentioned, except as described in the appended claims.

What is claimed is:

1. A coating composition containing a drying oil having incorporated therein a positive oxidation catalyst and a controller of oxidation thereof comprising an aldehyde-amine condensation product or derivative thereof.

2. A coating composition containing a drying oil having incorporated therein a positive oxidation catalyst and a controller of oxidation thereof comprising an aliphatic aldehyde-amine condensation product or derivative thereof.

3. A coating composition containing a drying oil having incorporated therein an inhibitor of oxidation thereof comprising a rearranged aliphatic aldehyde-aromatic amine condensation product further reacted with beta naphthol.

4. A coating composition containing a drying oil having incorporated therein an inhibitor of oxidation thereof comprising the reaction product of p,p'diamino diphenylmethane with a naphthol.

5. A coating composition containing a drying oil having incorporated therein an inhibitor of oxidation thereof comprising the reaction product of p,p'diamino diphenylmethane with beta naphthol.

6. A coating composition containing a drying oil having incorporated therein an inhibitor of oxidation thereof comprising the reaction product of substantially one molecular proportion of p,p'diamino diphenylmethane with substantially two molecular proportions of beta naphthol.

7. The improvement in the manufacture of coating compositions which comprises mixing the composition containing a drying oil with a positive oxidation catalyst and a controller of oxidation thereof comprising an aldehyde-amine condensation product or derivative thereof.

8. The improvement in the manufacture of coating compositions which comprises mixing the composition containing a drying oil with a positive oxidation catalyst and a controller of oxidation thereof comprising an aliphatic aldehyde-amine condensation product or derivative thereof.

9. The improvement in the manufacture of coating compositions which comprises mixing the composition containing a drying oil with an inhibitor of oxidation thereof comprising a rearranged aliphatic aldehyde-aromatic amine condensation product further reacted with beta naphthol.

10. The improvement in the manufacture of coating compositions which comprises mixing the composition containing a drying oil with an inhibitor of oxidation thereof comprising the reaction product of p,p'diamino diphenylmethane with a naphthol.

11. The improvement in the manufacture of coating compositions which comprises mixing the composition containing a drying oil with an inhibitor of oxidation thereof comprising the reaction product of p,p'diamino diphenylmethane with beta naphthol.

12. The improvement in the manufacture of coating compositions which comprises mixing the composition containing a drying oil with an inhibitor of oxidation thereof comprising the reaction product of substantially one molecular proportion of p,p'diamino diphenylmethane with substantially two molecular proportions of beta naphthol.

13. A coating composition containing a drying oil having incorporated therein a positive oxidation catalyst and controller of oxidation thereof comprising a rearranged aliphtic aldehyde-aromatic amine condensation product further reacted with beta naphthol.

14. A coating composition containing a drying oil having incorporated therein a positive oxidation catalyst and controller of oxidation thereof comprising the condensation product of p,p'diamino diphenyl methane with a naphthol.

15. A coating composition containing a drying oil having incorporated therein a positive oxidation catalyst and controller of oxidation thereof comprising the condensation product of p,p'diamino diphenyl methane with beta naphthol.

16. A coating composition containing a drying oil having incorporated therein a positive oxidation catalyst and controller of oxidation thereof comprising the condensation product of substantially one molecular proportion of p,p'diamino diphenyl methane with substantially two molecular proportions of beta naphthol.

17. The improvement in the manufacture of coating compositions which comprises mixing the composition containing a drying oil with a positive oxidation catalyst and a controller of oxidation thereof comprising a rearranged aliphatic aldehyde-aromatic amine condensation product further reacted with beta naphthol.

18. The improvement in the manufacture of coating compositions which comprises mixing the composition containing a drying oil with a positive oxidation catalyst and a controller of oxidation thereof comprising the condensation product of p,p'diamino diphenyl methane with a naphthol.

19. The improvement in the manufacture of coating compositions which comprises mixing the composition containing a drying oil with a positive oxidation catalyst and a controller of oxidation thereof comprising the condensation product of p,p'diamino diphenyl methane with beta naphthol.

20. The improvement in the manufacture of coating compositions which comprises mixing the composition containing a drying oil with a positive oxidation catalyst and a controller of oxidation thereof comprising the condensation product of substantially one molecular proportion of p,p'diamino diphenyl methane with substantially two molecular proportions of beta naphthol.

ROBERT L. SIBLEY.